United States Patent
Kobayashi et al.

(10) Patent No.: US 6,448,372 B2
(45) Date of Patent: *Sep. 10, 2002

(54) PROCESS FOR PRODUCING VINYL CHLORIDE POLYMER WITH LOW RESIDUAL MONOMER

(75) Inventors: Takashi Kobayashi; Ryuichi Saito; Yoshinori Nakahara; Tadashi Amano, all of Kamisu-machi; Ichiro Hara, Hasaki-machi, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/764,093

(22) Filed: Jan. 19, 2001

(30) Foreign Application Priority Data

Jan. 21, 2000 (JP) ........................................ 2000-013357
Jan. 21, 2000 (JP) ........................................ 2000-013358

(51) Int. Cl.$^7$ ................................ C08F 6/24; C08F 2/00
(52) U.S. Cl. ........................................ 528/500; 528/503
(58) Field of Search ................................ 528/500, 502, 528/503

(56) References Cited

U.S. PATENT DOCUMENTS

| 4,526,656 | A |   | 7/1985  | Okada et al. ............... 202/158 |
| 5,756,626 | A |   | 5/1998  | Park et al. .................. 526/333 |
| 5,789,499 | A |   | 8/1998  | Masuko et al. ............... 526/62 |
| 6,242,562 | B1 | * | 6/2001  | Kobayashi .................. 528/503 |
| 6,332,958 | B1 | * | 12/2001 | Matsuda ..................... 203/49 |

* cited by examiner

Primary Examiner—Christopher Henderson
(74) Attorney, Agent, or Firm—Oblon, Spivak, McClelland, Maier & Neustadt, P.C.

(57) ABSTRACT

A process for producing a vinyl chloride polymer, including the steps of (a) subjecting a vinyl chloride monomer alone or a monomer mixture containing a vinyl chloride, to suspension polymerization in water; (b) subjecting the resultant vinyl chloride polymer slurry to stripping to remove an unreacted monomer remaining therein; and (c) dehydrating the polymer slurry having been subjected to stripping. In the polymerization step (a), the ratio of water/monomer is set in a weight ratio of from 0.80 to 1.50, and the viscosity at 20° C. of the polymer slurry to be fed to the stripping step is previously kept adjusted to 0.30 Pa·s or lower. In the stripping step (c), the residual unreacted monomer in the polymer slurry can efficiently be removed using steam in a smaller quantity, thus the vinyl chloride polymer can be produced at a high productivity.

10 Claims, No Drawings

PROCESS FOR PRODUCING VINYL CHLORIDE POLYMER WITH LOW RESIDUAL MONOMER

BACKGROUND OF THE INVENTION

1. Field of the Invention

This invention relates to a process for producing a vinyl chloride polymer.

2. Description of the Prior Art

Vinyl chloride polymers are commonly produced through the following steps. A vinyl chloride monomer alone or a mixture of a vinyl chloride monomer and a vinyl monomer copolymerizable therewith, deionized water, a polymerization initiator and a dispersant are introduced into a polymerization vessel. Maintaining these at a stated temperature (usually from 30 to 75° C.) with stirring, polymerization is carried out until it comes to a conversion of 60 to 98%. At a point of time where the conversion has reached a stated value, a polymerization inhibitor is introduced to stop the polymerization. After the polymerization has been completed, an unreacted monomer or monomers remain(s) in a large quantity in the polymerization vessel and in the resultant vinyl chloride polymer slurry. Accordingly, after the polymerization has been stopped, the unreacted monomer is recovered out of the polymerization vessel by evacuation. Thereafter, the polymer slurry obtained by the polymerization reaction is withdrawn out of the polymerization vessel into a blow-down tank. The polymer slurry is further fed into a monomer stripping column (hereinafter "stripper"), where the polymer slurry is subjected to stripping to remove the unreacted monomer remaining in the slurry. Then, the polymer slurry from which the residual unreacted monomer has been reduced is fed into a decanter, followed by dehydration, and thereafter the dehydrate is fed to a drying step to effect drying. Through the foregoing steps, a dried vinyl chloride polymer product is manufactured.

In recent years, in the manufacture of vinyl chloride polymers, it has become common to lower the weight ratio of water/monomer per one batch of polymerization to 1.50 or below to charge the monomer in a larger quantity in order to improve productivity. However, polymerization carried out at the water/monomer weight ratio lowered to 1.50 or below makes the unreacted monomer remain in the resultant polymer slurry in a larger quantity.

Meanwhile, where the residual unreacted monomer is in a large quantity in the polymer slurry fed to the step of dehydration, almost all the monomer harmful to human beings is discharged to the atmosphere in the step of dehydration and the subsequent step of drying. Also, the residual monomer may remain in the dried vinyl chloride polymer product in a larger quantity. Thus, this is very unfavorable from the standpoint of safety and sanitation and environmental problems. Accordingly, the residual unreacted monomer in the polymer slurry obtained in the step of polymerization must sufficiently be reduced by means of the stripper. As a method by which the residual unreacted monomer in the polymer slurry is more reduced, a method of feeding steam to the stripper in a large quantity is known in the art. This method, however, is undesirable from the viewpoint of energy saving and cost reduction, and also may cause burnt matter of vinyl chloride polymers in the stripper because of the steam. Such burnt matter may remain in final products as foreign matter to cause a problem. Accordingly, it has been sought to provide a method by which the residual unreacted monomer in the polymer slurry can efficiently be removed using steam in a smaller quantity in the stripper.

SUMMARY OF THE INVENTION

An object of the present invention is to provide a process for producing a vinyl chloride polymer at a high productivity, in the stripping step of which the residual unreacted monomer in the polymer slurry can efficiently be removed using steam in a smaller quantity.

As a result of extensive researches and studies on the above problems the prior art has had, the present inventors have discovered that, when the proportion of water/monomer is lowered to a weight ratio of 1.50 or below to charge the monomer in a larger quantity, the polymer slurry may be fed into the stripper after the viscosity (20° C.) of the resultant vinyl chloride polymer slurry has been adjusted to a specific range by further adding water to carry out stripping, whereby the residual unreacted monomer in the polymer slurry can effectively be reduced to bring about an improvement in productivity per one batch of polymerization. Thus, they have accomplished the present invention.

More specifically, the present invention provides a process for producing a vinyl chloride polymer, comprising the steps of:

(a) subjecting a vinyl chloride monomer alone or a mixture of a vinyl chloride monomer and a vinyl monomer copolymerizable therewith, to suspension polymerization in water in the presence of a polymerization initiator and a dispersant;

(b) subjecting the resultant vinyl chloride polymer slurry (hereinafter often "polymer slurry A") to stripping to remove an unreacted monomer remaining in the slurry; and (c) dehydrating the polymer slurry having been subjected to stripping;

wherein, in the polymerization step (a), the proportion of water/monomer is set in a weight ratio of from 0.80 to 1.50, and the viscosity at 20° C. of the polymer slurry A to be fed to the stripping step is previously kept adjusted to 0.30 Pa·s (300 cP) or lower.

DETAILED DESCRIPTION OF THE INVENTION

The present invention will be described below in detail.

(a) Polymerization Step

The polymerization step is the step of subjecting a vinyl chloride monomer alone or a mixture of a vinyl chloride monomer and a vinyl monomer copolymerizable therewith (hereinafter often "monomer mixture"), to suspension polymerization in water in the presence of a polymerization initiator and a dispersant to obtain a vinyl chloride polymer slurry. In the process of the present invention, it is essential that the proportion of water/monomer is set in a weight ratio ranging from 0.80 to 1.50.

This polymerization step is described below in greater detail.

A vinyl chloride monomer or monomer mixture, deionized water, a polymerization initiator and a dispersant are introduced into a polymerization vessel, and polymerization is carried out maintaining a stated temperature (from 30 to 75° C.) with stirring. At a point of time where the conversion has reached a stated value (60 to 98%), a polymerization inhibitor is introduced to stop the polymerization.

As the monomer, a vinyl chloride monomer or a monomer mixture of a vinyl chloride monomer and a vinyl monomer copolymerizable with the vinyl chloride monomer (usually containing 50% by weight, and preferably 70% by weight or more, of the vinyl chloride monomer) is used. The copolymerizable vinyl monomer in the monomer mixture may include monomers exemplified by α-olefins such as ethylene, propylene, 1-butene, 1-pentene, 1-hexene, 1-heptene, 1-octene, 1-nonene, 1-decene, 1-undecene, 1-tridecene and 1-tetradecene, vinyl esters such as maleic acid, maleic anhydride, vinyl acetate and vinyl propionate, vinyl ethers such as lauryl vinyl ether and isobutyl vinyl ether, vinylidene chloride, acrylic acid, styrene, α-methylstyrene, and acrylonitrile. Any of these may be used alone or in combination of two or more types.

The polymerization initiator may include those exemplified by diacyl organoperoxides such as isobutyryl peroxide, 3,5,5-trimethylhexanolyl peroxide and lauroyl peroxide, peroxyester organoperoxides such as cumyl peroxyneodecanoate, t-butyl peroxyneoheptanoate, t-butyl peroxyneodecanoate and t-hexyl peroxyneodecanoate, and peroxydicarbonate organoperoxides such as diallyl peroxydicarbonate and bis(2-ethylhexyl) peroxydicarbonate. Any of these may be used alone or in combination of two or more types. Any of these organoperoxide type polymerization initiators may usually be used in an amount of from 0.01 to 0.3 part by weight, and preferably from 0.03 to 0.2 part by weight, based on 100 parts by weight of the whole monomer to be charged.

The dispersant may include those exemplified by cellulose derivatives such as methyl cellulose, hydroxyethyl cellulose, hydroxypropyl cellulose and hydroxypropyl methyl cellulose, water-soluble or oil-soluble partially saponified polyvinyl alcohols, and water-soluble polymers such as acrylic acid polymer and gelatin. Any of these may be used alone or in combination of two or more types. Also, any of these dispersants may be used in combination with at least one of nonionic emulsifiers such as sorbitan monolaurate, sorbitan trilaurate, glycerol tristearate and an ethylene oxide-propylene oxide block copolymer, and anionic emulsifiers such as polyoxyethylene sorbitan monolaurate, polyoxyethylene glycerol oleate and sodium lauryl sulfate. The dispersant may usually be used in an amount of from 0.02 to 0.2 part by weight, and preferably from 0.05 to 0.15 part by weight, based on 100 parts by weight of the whole monomer to be charged.

In the present invention, the proportion of the deionized water to monomer to be charged, i.e., the ratio of water/monomer (weight ratio) is usually from 0.8 to 1.5, and preferably from 1.0 to 1.3. If this water/monomer ratio is more than 1.5, the production (productivity) per one batch of polymerization may lower. If on the other hand the water/monomer ratio is less than 0.8, the viscosity of the slurry may increase with progress of polymerization reaction and the stirring may become imperfect to cause coarse particles, which can be the cause of fish eyes. Also, the slurry may have low heat transfer properties to make heat not well removable through the jacket, bringing internal-temperature control into bad condition to cause difficulties such that the reaction runs away in some cases.

The monomer is consumed with progress of polymerization reaction such that the pressure is not more than the saturated vapor pressure of monomer in the gaseous phase portion inside the polymerization vessel, whereupon the internal pressure of the polymerization vessel begins to lower. After this internal pressure begins to lower, it becomes able to catch conversion. Accordingly, the conversion is judged from the internal pressure of the polymerization vessel, and the polymerization inhibitor is introduced at a point of time where it has come to a stated polymerization vessel internal pressure (conversion), to stop polymerization. The point of time to stop polymerization is at the time the conversion has reached 60 to 98%. In order to more improve productivity, it may preferably be at the time the conversion has reached 80 to 95%.

The polymerization inhibitor may include those exemplified by ethylenebis(oxyethylene)bis[3-(5-t-butyl-4-hydroxy-m-tolyl)propionate], 2,6-di-t-butyl-p-t-butyl-4-hydroxyanisol (2-BHA), 2,2'-methylenebis(4-methyl-6-t-butylphenol (MBMBP), polybutyrated bisphenol A, and bisphenol A. Any of these may be used alone or in combination of two or more types.

The polymerization inhibitor may usually be used in an amount of from 0.0001 to 0.5 part by weight, and preferably from 0.001 to 0.05 part by weight, based on 100 parts by weight of the whole monomer having been charged.

After the polymerization has been stopped, the unreacted monomer is recovered out of the polymerization vessel by evacuation, and then the vinyl chloride polymer slurry obtained is withdrawn out of the polymerization vessel into a blow-down tank.

(b) Stripping Step

The stripping step is the step of subjecting the vinyl chloride polymer slurry obtained in the polymerization step, to stripping to remove the unreacted monomer remaining in the slurry. In the process of the present invention, it is essential that the viscosity at 20° C. of the polymer slurry to be fed into the stripper is previously kept adjusted to 0.3 Pa·s (300 cP) or lower.

This stripping step is described below in greater detail.

After the polymerization has been stopped, it is usually intended to remove the unreacted monomer by evacuation. Even after this operation, however, usually from about 3,000 to 30,000 ppm of unreacted monomers remain in the polymer slurry without being completely recovered. Accordingly, the polymer slurry in the blow-down tank is fed into a stripper, where the polymer slurry is subjected to stripping to remove the unreacted monomer remaining in the slurry. The removal of the residual unreacted monomer by stripping may be made by any method commonly used. For example, a method disclosed in Japanese Laid-open Publication (Kokai) No. 54-8693 is available. This method is a method in which, into a stripper having in the column a plurality of trays made of perforated plates, the polymer slurry containing the residual unreacted monomer is fed from its column top and steam is fed from its column bottom. In this method, the polymer slurry falls through the plurality of trays made of perforated plates in the column, in the course of which it comes into contact with the steam coming up from the column bottom through the pores of the trays, so that the unreacted monomer remaining in the polymer slurry vaporizes to become separated. Thus, the residual unreacted monomer is recovered from the column top and the polymer slurry is withdrawn out from the column bottom. Through this step, the content of the unreacted monomer remaining in the polymer slurry becomes not more than 50 ppm, and preferably not more than 10 ppm.

The viscosity of the polymer slurry to be fed into the stripper may be adjusted by a method described below.

In the present invention, the proportion of the water and monomer charged for polymerization, the water/monomer ratio, is set as low as 0.80 to 1.50 in order to improve the productivity per one batch of polymerization. Hence, the polymer slurry obtained after the polymerization is completed has usually a viscosity of from 0.5 to 1.0 Pa·s ((500 to 1,000 cP), and may have a viscosity higher than 1.0 Pa·s in some cases. In the case of such a polymer slurry having a viscosity of about 0.5 to 1.0 Pa·s, the unreacted monomer remaining in the polymer slurry appears to insufficiently come in contact with the steam when fed into the stripper. In the process of the present invention, it is essential that the viscosity at 20° C. of the polymer slurry to be fed into the stripper is adjusted to 0.3 Pa·s (300 cP) or lower, and preferably 0.1 Pa·s (100 cP) or lower. If the polymer slurry to be fed into the stripper has a viscosity higher than 0.3 Pa·s, the unreacted monomer remaining in the polymer slurry can not efficiently be removed even by stripping and may remain in a large quantity, so that the residual unreacted monomer is in a large quantity in the polymer slurry fed to the step of dehydration, and almost all the monomer harmful to human beings is discharged to the atmosphere in the step of dehydration and the subsequent step of drying. Also, the residual monomer may remain in the dried vinyl chloride polymer product in a larger quantity. Thus, this is very unfavorable from the standpoint of safety and sanitation and environmental problems.

In the process of the present invention, the viscosity of the polymer slurry to be fed into the stripper is adjusted by adding water to the polymer slurry obtained after the polymerization is completed. There are no particular limitations on the water to be added. Deionized water may be used like the water charged for polymerization.

With regard to the time and place (place in the apparatus) at which this water is added, there are no particular limitations thereon as long as it is added before the polymer slurry is fed into the stripper. When, however, the water is added in the step of polymerization, it is so added that the water/monomer ratio is kept within the range of from 0.80 to 1.50 so as not to lower the productivity per one batch of polymerization.

Stated specifically, the method for adding the water may include the following examples.

1) In the course of polymerization the reaction mixture undergoes volume shrinkage with progress of polymerization. Accordingly, the water is continuously or intermittently added in such an amount that only the reduced volume due to the shrinkage is supplemented, or, after the polymerization is completed, the water is added in such an amount that only the reduced volume due to the shrinkage is supplemented.

2) After the polymerization is completed, the water is added to the polymer slurry withdrawn out into the blow-down tank.

3) The water is added in a pipe through which the polymer slurry is sent, i.e., in a pipe provided between the polymerization vessel and the blow-down tank or a pipe provided between the blow-down tank and the stripper.

If necessary, it is also effective to use any two or three of the above methods 1) to 3) in combination.

The polymer slurry having been subjected to the stripping is fed to the step of dehydration.

In another embodiment of the present invention, as the water added to adjust the viscosity of the polymer slurry to be fed into the stripper, waste water may be used which comes from the step-(c) dehydration to which a different polymer slurry (hereinafter often "polymer slurry B") obtained separately through the step (a) of polymerization and the step- (b) stripping has been subjected. The step- (b) stripping is as described above. The step-(c) dehydration is usually carried out by means of a dehydrator such as a decanter, and the waste water coming therefrom is recovered from the dehydrator and then used.

According to this embodiment, since the waste water coming from the step- (c) dehydration can be reused, there can be an advantage that the disposal to discard this waste water can be saved. Also, since the waste water to be reused has a high temperature, there can be another advantage that the steam used in the stripping can be in a smaller quantity. More specifically, the polymer slurry fed from the stripper to the dehydrator has a temperature of about 80 to 110° C. and the waste water collected from the dehydrator has a high temperature of about 50 to 90° C. The collected waste water to be fed to the polymer slurry held in the blow-down tank also has a high temperature of about 40 to 70° C.

The step of polymerization separately carried out to obtain such high-temperature collected waste water (hereinafter often "separate polymerization step") may be identical with or different from the polymerization step for producing the polymer slurry A as long as it is the polymerization step described above. In view of the stabilization of quality (e.g., molecular weight, purity and color tone) of the dried vinyl chloride polymer product finally obtained, the former may preferably be the same polymerization as the latter. What is herein meant by "identical" or "different" is that polymerization conditions in the polymerization step are identical or different. Such polymerization conditions may include, e.g. polymerization temperature, polymerization pressure (the internal pressure of the polymerization vessel during polymerization), the types and quantities of the monomer used, dispersant, polymerization initiator and other additives, and the quantity of water charged.

With regard to the conditions (e.g., the feed, concentration, specific gravity and temperature of the slurry, and the pressure and feed of the steam) for the stripping step for the polymer slurry B and the conditions (e.g., water content after dehydration) for the dehydration step, too, they may be identical with or different from the conditions for the stripping step and dehydration step for the polymer slurry A. For the same reason as the foregoing, the former may preferably be identical with the latter. The equipment (e.g., the polymerization vessel, the blow-down tank, the stripper and the dehydrator) used in the polymerization step may also be identical with or different from the equipment used in the polymerization step, stripping step and dehydration step for the polymer slurry A as long as the desired polymerization conditions, stripping conditions and dehydration conditions are correspondingly achievable. For the same reason as the foregoing, the former may preferably be identical with the latter.

Thus, as the collected waste water used to adjust the viscosity, preferred are 1) collected waste water of the polymer slurry B obtained under polymerization conditions, stripping conditions and dehydration conditions and by means of equipment which are identical with those in the case of the polymer slurry A, and besides 2) collected waste water having a temperature higher than the temperature of the polymer slurry A held in the blow-down tank (in this case, the polymerization conditions, stripping conditions and dehydration conditions for the polymer slurry B for obtaining the collected waste water may be identical with or different from the polymerization conditions, stripping conditions and dehydration conditions for the polymer slurry A; the former may preferably be identical with the latter.

(c) Dehydration Step

The dehydration step is the step of feeding the polymer slurry having been subjected to stripping, to usually a dehydrator such as a decanter to effect dehydration. As conditions for dehydration, the dehydration may be carried out under conditions that may provide a water content of about 18 to 25% by weight.

The polymer having thus subjected to dehydration is then forwarded to the step of drying, and is dried there to become a dried vinyl chloride polymer product. The drying may usually be carried out at a temperature of from 50° C. to 80° C.

EXAMPLES

The present invention will be described below in greater detail by giving Examples. The present invention is by no means limited to the following Examples. In Examples, viscosity is given as viscosity at 20° C.

Example 1

As a polymerization vessel for carrying out suspension polymerization of a vinyl chloride monomer, used was a polymerization vessel made of stainless steel, having an inner volume of 130 m$^3$ and provided with a reflux condenser, an external jacket and a stirrer.

Into this polymerization vessel, 54.8 t of deionized water was charged, and then 0.4 t of an aqueous solution in which 16.8 kg of water-soluble partially saponified polyvinyl alcohol and 7.2 kg of hydroxypropyl methyl cellulose were dissolved as dispersants was introduced, followed by stirring. After the inside of the polymerization vessel was evacuated to 6.65 kPa (50 mmHg), 48.0 t of vinyl chloride monomer (hereinafter "VCM") was charged into the polymerization vessel with stirring, and further 40 kg of an isoparaffin solution in which 8.8 kg of bis(2-ethylhexyl) peroxydicarbonate, 13.3 kg of t-butyl peroxyneodecanoate and 6.2 kg of cumyl peroxyneodecanoate were dissolved as polymerization initiators was press-charged into the polymerization vessel by means of a pump to form a mixture. Thereafter, heated water was led into the external jacket to raise temperature to initiate polymerization. Here, the proportion of the water charged (inclusive of the aqueous dispersant solution) to VCM (water/monomer) was in a weight ratio of (54.8+0.4)/48.0=1.15. Next, cooling water was begun to be led into the external jacket at a point of time where the internal temperature reached a predetermined polymerization temperature of 56° C. and also, 20 minutes after that point of time, the reflux condenser was made to start heat elimination to keep the internal temperature at 56° C., where the polymerization was continued. At a point of time (conversion: 88.5%) where the internal pressure of the polymerization vessel lowered to 0.49 MPa (5.0 kgf/cm$^2$) (gauge pressure), 10 kg of ethylenebis(oxyethylene)bis[3-(5-t-butyl-4-hydroxy-m-tolyl)propio nate was introduced as a polymerization inhibitor to stop the polymerization.

After the polymerization was stopped, the unreacted monomer was collected from the polymerization vessel by evacuation, and the polymer slurry obtained was withdrawn out of the polymerization vessel into a blow-down tank of 300 m$^3$ in volume. At this stage, the polymer slurry had a viscosity of 0.85 Pa·s (850 cP). Thereafter, 5.9 t of deionized water was fed into the blow-down tank.

To remove the unreacted monomer contained in the polymer slurry, the polymer slurry was further fed into a stripper. The polymer slurry fed into the stripper from its column top was in a feed of 30.0 m$^3$/h and a concentration of 41.0% and had a specific gravity of 1.133 t/m$^3$, a temperature of 52.3° C. and a viscosity of 0.025 Pa·s (25 cP). The viscosity of the polymer slurry was measured by a method *1 shown below. Steam fed into the stripper from its column bottom was at a feed pressure of 0.392 MPa (4.0 kg/cm$^2$) (gauge pressure) and in a feed of 2.7 t/h.

Concentration of the residual VCM in the polymer slurry withdrawn out of the stripper from its column bottom was measured to find that it was 7 ppm. The concentration of the residual VCM in the polymer slurry was measured by a method *2 shown below. The unit of the steam consumed in the stripper at this stage was calculated to find that it was 0.194 t/t (which shows that the steam consumed per t of dried PVC is in an amount of 0.194 t). This steam unit was calculated by a method shown below.

Steam unit=steam feed $(t/h)/\{$slurry feed $(m^3/h) \times$ specific gravity $(t/m^3) \times [$ concentration $(\%)/100]\}$.

Next, the polymer slurry withdrawn out of the stripper was sampled in an amount of about 1 L (liter), and the sample was dehydrated and then dried at 50° C. to obtain a dried vinyl chloride polymer (PVC). Quantity of foreign matter in this dried PVC was measured to find that it was two per 100 g of PVC. The quantity of foreign matter was measured by visually counting the number of PVC particles colored in yellow to dark brown (burnt matter) in 100 g of the dried PVC obtained.

*1 Measurement of Slurry Viscosity:

V (L, liter) of slurry with a specific gravity ρ (kg/m$^3$) was introduced into a cylindrical container made of stainless steel, having a diameter D (m) and a height 1 m, and liquid level was set in a height H (m), where the polymer slurry was stirred at a number of revolutions of n (per second) without any stirring blade to measure its base torque. Next, a wing type stirring blade was attached to the container at its position of 5 cm distant from the bottom, where the polymer slurry was stirred in the same manner as the above to measure its stirring torque with a stirring blade. Net torque T was calculated according to the following equation:

T (kg·m)=(stirring torque with stirring blade)−(base torque).

Next, V (L) of pure water was likewise introduced and the pure water net torque $T_{H2O}$ (kg·m) was calculated in the same way.

The stirring blade was a wing type stirring blade having a wing length d (m) and a wing width b (m). Slurry viscosity μ (kg/m·s) was calculated according to Nagata's equation:

μ=(d$^2$·n·ρ)/Re(Re: Reynolds number), prescribed in Chemical Engineering Handbook, Revised 6th Ed., p.431.

In the case of the water, its viscosity depending on temperature was known. Accordingly, Reynolds number of the water Re (H$_2$O) was calculated according to the following equation:

Re(H$_2$O)=(d$^2$·n·ρ)/μ(H$_2$O).

Power P necessary for the stirring of the polymer slurry and power $P_{H2O}$ (kg·m/s) necessary for the stirring of the pure water were respectively calculated according to the following equations:

P=2π·n·T and $P_{H2O}$=2π·n·$T_{H2O}$.

The ratio of the power P necessary for the stirring of the polymer slurry to the power $P_{H2O}$ necessary for the stirring of the pure water was calculated according to the following equation:

$$\frac{P \cdot \rho_{H2O}}{P_{H2O} \cdot \rho} =$$

$$\frac{2\pi \cdot n \cdot T}{2\pi \cdot n \cdot T_{H2O}} = \frac{A/Re + B\{(1{,}000 + 1.2Re^{0.66})/(1{,}000 + 3.2Re^{0.66})\}^Q}{A/Re(H_2O) + B\{(1{,}000 + 1.2Re(H_2O)^{0.66})/(1{,}000 + 3.2Re(H_2O)^{0.66})\}^Q}$$

wherein $A = 14 + (b/D)\{670(d/D - 0.6)^2 + 185\}$ $B = 10\hat{\ }\{1.3 - 4(d/D - 0.5)^2 - 1.14(b/D)\}$ $Q = 1.1 + 4(b/D) - 2.5(d/D - 0.5)^2 - 7(b/D)^4$ In the present embodiment, a water Reynolds number Re ($H_2O$) of 181,304, a Reynolds number Re of 8,293 and a slurry viscosity $\mu$ of 0.025 Pa·s (25 cP) were obtained from:
D=0.3 m, V=27.8L, H=0.35 m, n=8.33/s, T=0.062 kg·m, $T_{H2O}$=0.032 kg·m, d=0.1477 m, b=0.0213 m, $\pi$=1,133 kg/m³, $\pi_{H2O}$=1,000 kg/m³, $\mu(H_2O, 20°C.)$=0.001 Pa·s(1 cP)

*2 Measurement of Residual-VCM Concentration in Slurry:

The polymer slurry withdrawn out of the slipper from its column bottom was dissolved in THF (tetrahydrofuran) and its concentration of residual VCM was measured with a gas chromatograph (trade name: GC-9A) manufactured by Shimazu Corporation, under the following conditions:

Column: Made of stainless steel, 3 mm diameter and 3 mm long.

Column packing: Ucon oil LB-550X 20% (liquid phase), Chromosorb W/AW80-10Me (support).

Detecting zone: FID type (hydrogen-flame ionization detector).

COlumn temperature: 70° C.

Vaporizing-chamber temperature: 150° C.

Carrier gas: Nitrogen.

Combustion gas: Hydrogen, air.

Incidentally, the residual-VCM concentration (ppm) is concentration with respect to dried PVC.

The results of the foregoing are shown in Table 1 together with the quantity of the deionized water fed into the blow-down tank; the concentration, specific gravity, temperature and viscosity of the polymer slurry and the quantity of the steam, fed into the stripper; the residual-VCM concentration in the polymer slurry withdrawn out of the stripper; and the steam unit in the stripper.

Example 2 & Comparative Examples 1 & 2

Dried PVCs were produced in the same manner as in Example 1 except that the quantity of the deionized water fed into the blow-down tank; the concentration, specific gravity, temperature and viscosity of the polymer slurry and the quantity of the steam, fed into the stripper; the residual-VCM concentration in the polymer slurry withdrawn out of the stripper; and the steam unit in the stripper were set as shown in Table 1 or 2.

The results of the foregoing are shown in Table 1 or 2.

Example 3

Into the same stainless steel polymerization vessel as that in Example 1, 54.5 t of deionized water was charged, and then 0.5 t of an aqueous solution in which 23.2 kg of water-soluble partially saponified polyvinyl alcohol and 5.8 kg of hydroxypropyl methyl cellulose were dissolved as dispersants was introduced, followed by stirring. After the inside of the polymerization vessel was evacuated to 6.65 kPa (50 mmHg), 44.0 t of VCM was charged into the polymerization vessel with stirring, and then 60 kg of an isoparaffin solution in which 29.0 kg t-butyl peroxyneodecanoate and 12.3 kg of cumyl peroxyneodecanoate were dissolved as polymerization initiators was press-charged into the polymerization vessel by means of a pump to form a mixture. Thereafter, heated water was led into the external jacket to raise temperature to initiate polymerization. Here, the proportion of the water charged (inclusive of the aqueous dispersant solution) to VCM (water/monomer) was in a weight ratio of (54.5+0.5)/44.0=1.25. Cooling water was begun to be led into the external jacket at a point of time where the internal temperature reached a predetermined polymerization temperature of 52° C. and also, 20 minutes after that point of time, the ref lux condenser was made to start heat elimination to keep the internal temperature at 52° C., where the polymerization was continued. At a point of time (conversion: 89.9%) where the internal pressure of the polymerization vessel lowered to 0.392 MPa (4.0 kgf/cm²) (gauge pressure), 10 kg of ethylenebis(oxyethylene)bis[3-(5-t-butyl-4-hydroxy-m-tolyl)propio nate was introduced as a polymerization inhibitor to stop the polymerization.

After the polymerization was stopped, the unreacted monomer was recovered by evacuation the inside of the polymerization vessel and the polymer slurry obtained was withdrawn out of the polymerization vessel into a blow-down tank of 300 m³ in volume. At this stage, the polymer slurry had a viscosity of 0.67 Pa·s (670 cP). Thereafter, 9.3 t of deionized water was fed into the blow-down tank.

To remove the unreacted monomer contained in the polymer slurry, the polymer slurry was further fed into a stripper. The polymer slurry fed into the stripper from its column top was in a feed of 30.0 m³/h and a concentration of 38.1% and had a specific gravity of 1.122 t/m³, a temperature of 52.6° C. and a viscosity of 0.034 Pa·s (34 cP). Steam fed into the stripper from its column bottom was at a feed pressure of 0.392 MPa (4.0 kg/cm²) (gauge pressure) and in a feed of 2.3 t/h.

Concentration of the residual VCM in the polymer slurry withdrawn out of the stripper from its column bottom was measured to find that it was 4 ppm. The unit of the steam consumed in the stripper at this stage was calculated to find that it was 0.179 t/t (which shows that the steam consumed per t of dried PVC is in an amount of 0.179 t). These were calculated by the method as described in Example 1.

The results of the foregoing are shown in Table 1 or 2.

Example 4 & Comparative Examples 3 & 4

Dried PVCs were produced in the same manner as in Example 3 except that the quantity of the deionized water fed into the blow-down tank; the concentration, specific gravity, temperature and viscosity of the polymer slurry and the quantity of the steam, fed into the stripper; the residual-VCM concentration in the polymer slurry withdrawn out of the stripper; and the steam unit in the stripper were set as shown in Table 1 or 2.

The results of the foregoing are shown in Table 1 or 2.

TABLE 1

|  | Example 1 | Example 2 | Example 3 | Example 4 |
|---|---|---|---|---|
| Weight ratio of water/VCM charged in polymerization step: | 1.15 | 1.15 | 1.25 | 1.25 |
| Quantity of water fed into blow-down tank: (t) | 5.9 | 11.2 | 9.3 | 14.1 |
| Flow rate of slurry fed into stripper: (m³/h) | 30.0 | 30.0 | 30.0 | 30.0 |
| Temperature of slurry fed into stripper: (° C.) | 52.3 | 52.8 | 49.8 | 49.8 |
| Viscosity of slurry fed into stripper: (Pas) | 0.025 (25cP) | 0.012 (12cP) | 0.034 (34cP) | 0.018 (18cP) |
| Concentration of slurry fed into stripper: (%) | 41.0 | 39.0 | 38.1 | 36.4 |
| Specific gravity of slurry fed into stripper: (t/m³) | 1.133 | 1.125 | 1.122 | 1.116 |
| Flow rate of steam fed into stripper: (t/h) | 2.7 | 2.6 | 2.3 | 2.2 |
| Residual VCM concentration in slurry withdrawn out of stripper: (ppm) | 7 | 9 | 4 | 7 |
| Steam unit in stripper: (t/t) | 0.194 | 0.197 | 0.179 | 0.181 |
| Foreign matter particles in dried PVC: (number/100 g PVC) | 2 | 3 | 1 | 3 |

TABLE 2

|  | Comparative Example 1 | Comparative Example 2 | Comparative Example 3 | Comparative Example 4 |
|---|---|---|---|---|
| Weight ratio of water/VCM charged in polymerization step: | 1.15 | 1.15 | 1.25 | 1.25 |
| Quantity of water fed into blow-down tank: (t) | 0.0 | 0.0 | 0.0 | 0.0 |
| Flow rate of slurry fed into stripper: (m³/h) | 30.0 | 30.0 | 30.0 | 30.0 |
| Temperature of slurry fed into stripper: (° C.) | 52.2 | 53.1 | 49.7 | 50.1 |
| Viscosity of slurry fed into stripper: (Pas) | 0.85 (850cP) | 0.85 (850cP) | 0.67 (670cP) | 0.67 (670cP) |
| Concentration of slurry fed into stripper: (%) | 43.5 | 43.5 | 41.8 | 41.8 |
| Specific gravity of slurry fed into stripper: (t/m³) | 1.142 | 1.142 | 1.136 | 1.136 |
| Flow rate of steam fed into stripper: (t/h) | 2.9 | 3.7 | 2.6 | 3.5 |
| Residual VCM concentration in slurry withdrawn out of stripper: (ppm) | 65 | 9 | 60 | 7 |
| Steam unit in stripper: (t/t) | 0.195 | 0.248 | 0.183 | 0.246 |
| Foreign matter particles in dried PVC: (number/100 g PVC) | 3 | 178 | 2 | 126 |

As can be seen from Tables 1 and 2, according to the process of the present invention, the weight ratio of water/monomer charged in the polymerization step is set within the range of from 0.80 to 1.50 and also the viscosity of the vinyl chloride polymer slurry to be fed into the stripper is adjusted to 0.3 Pa·s (300 cP) or lower, whereby the residual unreacted monomer in the polymer slurry can efficiently be removed even in the energy-saving driving of the stripper in a small quantity of steam. Hence, the VCM discharged to the atmosphere can be kept in a lower quantity and also the foreign matter in the product vinyl chloride polymer can be made less.

Example 5

Into the same polymerization vessel as that in Example 1, 54.8 t of deionized water was charged, and then 0.4 t of an aqueous solution in which 16.8 kg of water-soluble partially saponified polyvinyl alcohol and 7.2 kg of hydroxypropyl methyl cellulose were dissolved was introduced, followed by stirring. After the inside of the polymerization vessel was evacuated to 6.65 kPa (50 mmHg), 48.0 t of VCM was charged into the polymerization vessel with stirring, and further 40 kg of an isoparaffin solution in which 8.8 kg of bis(2-ethylhexy) peroxydicarbonate, 13.3 kg t-butyl peroxyneodecanoate and 6.2 kg of cumyl peroxyneodecanoate were dissolved as polymerization initiators was press-charged into the polymerization vessel by means of a pump to form a charged mixture. Thereafter, heated water was led into the external jacket to raise temperature to initiate polymerization. Here, the proportion of the water charged (inclusive of the aqueous dispersant solution) to VCM (water/monomer) was in a weight ratio of (54.8+0.4)/48.0= 1.15. Cooling water was begun to be led into the external jacket at a point of time where the internal temperature reached a predetermined polymerization temperature of 56° C. and also, 20 minutes after that point of time, the reflux condenser was made to start heat elimination to keep the internal temperature at 56° C., where the polymerization was continued. At a point of time (conversion: 88.5%) where the internal pressure of the polymerization vessel lowered to 0.49 kPa (5.0 kgf/cm²) (gauge pressure), 10 kg of ethylenebis(oxyethylene)bis[3-(5-t-butyl-4-hydroxy-m-tolyl)propio nate was introduced as a polymerization inhibitor to stop the polymerization.

After the polymerization was stopped, the unreacted monomer was recovered by evacuation the inside of the polymerization vessel and the polymer slurry obtained was withdrawn out of the polymerization vessel into a blow-down tank of 300 m³ in volume. At this stage, the polymer slurry had a viscosity of 0.850 Pa·s (850 cP). Meanwhile, after the polymerization, in the blow-down tank, 5.9 t of waste water (85° C.) collected from the decanter, the waste water being obtained in the manner as described later, was fed to the polymer slurry (52.5° C.) just withdrawn out into the blow-down tank, whereupon the temperature of the polymer slurry held in the blow-down tank came to be 54.3° C.

To remove the unreacted monomer contained in the polymer slurry, the polymer slurry was further fed into a stripper. The polymer slurry fed into the stripper from its column top was in a feed of 30.0 m³/h and a concentration of 41.0% and had a specific gravity of 1.133 t/m³, a temperature of 54.3° C. and a viscosity of 0.025 Pa·s (25 cP). The viscosity of the polymer slurry was measured by the method *1 shown previously. Steam fed into the stripper from its column bottom was at a feed pressure of 0.392 MPa (4.0 kgf/cm²) (gauge pressure) and in a feed of 2.7 t/h.

Next, the polymer slurry withdrawn out of the stripper was sampled in an amount of about 1 L (liter), and the sample was filtered and dehydrated until its water content came to be 23% by weight, and then dried at 50° C. to obtain a dried PVC.

Quantity of foreign matter in this dried PVC was measured to find that it was two per 100 g of PVC. The quantity of foreign matter was measured by visually counting the number of PVC colored in yellow to dark brown (burnt matter) in 100 g of the dried PVC obtained.

As the "waste water (85° C.) collected from the decanter", used was waste water obtained in the following way.

Polymerization was carried out in the same manner as in Example 1, and the resultant polymer slurry was withdrawn into the blow-down tank. Here, 5.9 t of deionized water was fed into the blow-down tank to lower the temperature (52.5° C.) of the polymer slurry in the blow-down tank to 52.3° C. Next, this polymer slurry was fed into the stripper. The polymer slurry fed into the stripper from its column top was in a feed of 30.0 m³/h and a concentration of 41.0% and had a specific gravity of 1.133 t/m³ and a temperature of 52.3° C. Also, the steam fed into the stripper from its column bottom was at a feed pressure of 0.392 MPa (4.0 kg/cm²) (gauge pressure) and in a feed of 2.7 t/h. The polymer slurry (95° C.) withdrawn out of the stripper was fed into the decanter, and was dehydrated until it came to have a water content of 21% by weight, where waste water (85° C.) coming therefrom was collected. This waste water collected was used as the "waste water collected from the decanter" (hereinafter "decanter waste water") to be fed into the blow-down tank.

Example 6

A dried PVC was produced in the same manner as in Example 5 except that the quantity of the decanter waste water fed into the blow-down tank; the concentration, specific gravity, temperature and viscosity of the polymer slurry and the quantity of the steam, fed into the stripper; the residual-VCM concentration in the polymer slurry withdrawn out of the stripper; and the steam unit in the stripper were set as shown in Table 3.

The results of the foregoing are shown in Table 3.

TABLE 3

|  | Example 5 | Example 6 |
|---|---|---|
| Weight ratio of water/VCM charged in polymerization step: | 1.15 | 1.15 |
| Quantity of decanter waste water fed into blow-down tank: (t) | 5.9 | 11.2 |
| Flow rate of slurry fed into stripper: (m³/h) | 30.0 | 30.0 |
| Temperature of slurry fed into stripper:. (° C.) | 54.3 | 54.8 |
| Viscosity of slurry fed into stripper: (Pas) | 0.025 (25cP) | 0.012 (12cP) |
| Concentration of slurry fed into stripper: (%) | 41.0 | 39.0 |
| Specific gravity of slurry fed into stripper: (t/m³) | 1.133 | 1.125 |
| Flow rate of steam fed into stripper: (t/h) | 2.7 | 2.6 |
| Residual VCM concentration in slurry withdrawn out of stripper: (ppm) | 7 | 9 |
| Steam unit in stripper: (t/t) | 0.190 | 0.194 |
| Foreign matter particles in dried PVC: (number/100 g PVC) | 2 | 3 |

As can be seen from Table 3, in the present Example, the high-temperature decanter waste water is used when the viscosity of 5 the vinyl chloride polymer slurry to be fed into the stripper is adjusted to 0.3 Pa·s (300 cP) or lower, whereby not only the residual unreacted monomer in the polymer slurry can efficiently be removed, but also the steam unit in the stripper can be kept in a low value, and also the foreign matter in the product vinyl chloride polymer can be made less.

As described above, according to the present invention, the residual unreacted monomer in the polymer slurry can efficiently be removed using the steam in a small quantity, and hence the vinyl chloride polymer can be produced in a high productivity.

What is claimed is:

1. A process for producing a vinyl chloride polymer, comprising:

(a) subjecting a vinyl chloride monomer or a mixture of said vinyl chloride monomer and a vinyl monomer copolymerizable with said vinyl monomer to suspension polymerization in water in the presence of a polymerization initiator and a dispersant to obtain a vinyl chloride polymer slurry;

(b) subjecting the vinyl chloride polymer slurry to stripping to remove an unreacted monomer remaining in the slurry thereby obtaining a stripped polymer slurry; and (c) dehydrating the stripped polymer slurry;

wherein, in step (a), a weight ratio of water/monomer is from 0.80 to 1.50, and a viscosity at 20° C. of said vinyl chloride polymer slurry to be fed to step (b) is adjusted to 0.30 Pa·s or lower.

2. The process of claim 1, wherein the viscosity of said vinyl chloride polymer slurry fed to step (b) is adjusted by adding water to a reaction mixture in step (a) or to the vinyl chloride polymer slurry during or after step (a), before said vinyl chloride polymer slurry is fed to step (b).

3. The process of claim 2, wherein said water is waste water coming from the step (c); wherein a different polymer slurry obtained separately through the steps (a) and (b) has been subjected to step (c).

4. The process of claim 1, wherein said weight ratio of water/monomer is in a range of from 1.0 to 1.3.

5. The process of claim 2, wherein said water is added in such an amount that a volume of said vinyl chloride polymer slurry reduced due to shrinkage is supplemented.

6. The process of claim 2, wherein said water is added to the vinyl chloride polymer slurry which had been withdrawn in a blow-down tank after the suspension polymerization is completed.

7. The process of claim 2, wherein said water is added to a pipe through which the vinyl chloride polymer slurry is sent.

8. The process of claim 7, wherein said pipe is provided between a polymerization vessel and a blow-down tank or between the blow-down tank and a stripper.

9. The process of claim 2, wherein said water is added to the reaction mixture during step (a) such that the weight ratio of water/monomer is maintained within a range of 0.8 to 1.50.

10. The process of claim 3, wherein said waste water has a temperature of about 40 to 70° C.

* * * * *